US010097246B2

(12) United States Patent
Tosato et al.

(10) Patent No.: US 10,097,246 B2
(45) Date of Patent: *Oct. 9, 2018

(54) TRANSFORM-DOMAIN FEEDBACK SIGNALING FOR MIMO COMMUNICATION

(71) Applicant: KONINKLIJKE PHILIPS N.V., Eindhoven (NL)

(72) Inventors: Filippo Tosato, Redhill (GB); Timothy James Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 206 days.

This patent is subject to a terminal disclaimer.

(21) Appl. No.: 14/969,369

(22) Filed: Dec. 15, 2015

(65) Prior Publication Data

US 2016/0105225 A1    Apr. 14, 2016

Related U.S. Application Data

(63) Continuation of application No. 12/438,191, filed as application No. PCT/IB2007/053302 on Aug. 20, 2007, now Pat. No. 9,231,683.

(30) Foreign Application Priority Data

Aug. 21, 2006  (EP) ..................................... 06119257
Aug. 22, 2006  (EP) ..................................... 06119316
(Continued)

(51) Int. Cl.
*H04B 7/06*     (2006.01)
*H04B 7/0417*   (2017.01)
(Continued)

(52) U.S. Cl.
CPC ......... *H04B 7/0417* (2013.01); *H04B 7/0626* (2013.01); *H04B 7/0632* (2013.01);
(Continued)

(58) Field of Classification Search
CPC .. H04B 7/0632; H04B 7/0639; H04B 7/0634; H04B 7/0413; H04B 17/24; H04B 17/336; H04B 7/0417; H04B 17/0626
See application file for complete search history.

(56) References Cited

U.S. PATENT DOCUMENTS

2002/0176485 A1\* 11/2002 Hudson ................. H04L 1/0618
                                                           375/144
2003/0128658 A1    7/2003 Walton et al.
(Continued)

FOREIGN PATENT DOCUMENTS

WO         03023995 A1    3/2003
WO      2005125139 A1   12/2005
(Continued)

OTHER PUBLICATIONS

Jindal, "MIMO Broadcasta Channels With Finite Rate Feedback", IEEE Globecom, 2005, pp. 1520-1524.
(Continued)

*Primary Examiner* — Syed Haider

(57) ABSTRACT

A control method for a communication network that has a transmitter with an array of transmit antennas and that has at least one receiver communicating with the transmitter. The receiver performs a channel measurement for a receive antenna of the receiver using a signal transmitted from the transmitter to the receiver. The receiver further determines channel coefficients for each of an array of transmit antennas at the transmitter from an output of the channel measurement, and then applies a linear, reversible and orthogonal transform to the channel coefficients, thus ascertaining channel component coefficients indicative of the individual weight of respective channel components in a transform domain. The receiver then selects one or more channel components in the transform domain and communicates to the transmitter a control signal indicative of one or more
(Continued)

preferred channel components or a magnitude of one or more channel component coefficients, or both, in quantized form. The transmitter receives the control signal and constructs a beam pattern in the transform domain using the information received from the receiver.

46 Claims, 12 Drawing Sheets

(30) Foreign Application Priority Data

| Oct. 4, 2006 | (EP) | 06121757 |
|---|---|---|
| Nov. 6, 2006 | (EP) | 06123530 |
| Apr. 30, 2007 | (EP) | 07301009 |

(51) Int. Cl.
  *H04B 7/0413* (2017.01)
  *H04B 17/336* (2015.01)

(52) U.S. Cl.
  CPC ......... *H04B 7/0634* (2013.01); *H04B 7/0639* (2013.01); *H04B 7/0413* (2013.01); *H04B 17/336* (2015.01)

(56) References Cited

U.S. PATENT DOCUMENTS

| 2005/0287978 | A1* | 12/2005 | Maltsev | H04B 7/0634 455/403 |
|---|---|---|---|---|
| 2006/0029157 | A1 | 2/2006 | Dabak et al. | |
| 2006/0094373 | A1* | 5/2006 | Hottinen | H04B 7/0617 455/73 |
| 2007/0280366 | A1 | 12/2007 | Aytur et al. | |
| 2007/0281624 | A1 | 12/2007 | Thomas et al. | |
| 2007/0287385 | A1 | 12/2007 | Stephenne | |

FOREIGN PATENT DOCUMENTS

| WO | 2006006770 A1 | 1/2006 |
|---|---|---|
| WO | 2006020520 A2 | 2/2006 |

OTHER PUBLICATIONS

Bishwarup et al, "Frame Theoretic Quantization for Limited Feedback MIMO Beamforming Systems", International Conference on Wireless Networks, Communications and Mobile Computing, 2005, pp. 1065-1070.

Jindal, "A Feedback Reduction Technique for MIMO Broadcast Channels", Dept. of Electrical and Computer Engineering, University of Minnesota, Undated, pp. 1-5.

Betlehem et al, "Space-Time MIMO Channel Modelling Using Angular Power Distributions", 7th Australian Communications Theory Workshop, 2006, pp. 163-168.

Fuchs et al, "A Novel Tree-Based Scheduling Algorithm for the Downlink of Multi-User MIMO Systems With ZF Beamforming", Acoustics, Speech and Signal Processing, 2005, vol. 3, pp. 1121-1124.

Ghavami, "Wideband Smart Antenna Theory Using Rectangular Array Structures", IEEE Transactions on Signal Processing, vol. 50, No. 9, Sep. 2002, pp. 2143-2151.

Uthansakul et al, "A Wideband Spatial Beamformer Employing a Rectangular Array of Planar Monopoles", IEEE, vol. 1B, 2005, pp. 303-306.

Uthansakul et al, "Design and Performance Assesment of a Wideband Smart Antenna Employing Only Spatial Signal Processing", IEEE Antennas and Propagation Society International Symposium, 2006 pp. 2525-2528.

Love, "Equal Gain Transmission in Multiple-Inut Multiple-Output Wireless Systems", IEEE Transactions On Communicatoins, vol. 51, No. 7, Jul. 2003, pp. 1102-1110.

Qualcomm Europe, "Description of Single and Multi Codeword Schemes With Precoding", 3GPP TSG-RAN WG1 #44, R1-060457, Feb. 2006, pp. 1-10.

* cited by examiner

TRANSFORM-DOMAIN FEEDBACK SIGNALING FOR MIMO COMMUNICATION

CROSS-REFERENCE TO RELATED APPLICATION

This application is a continuation application of U.S. Ser. No. 12/438,191, filed Feb. 20, 2009, now pending, which is a National Stage Entry of PCT/IB2007/053302 filed on Aug. 20, 2007, now expired, which claims the benefit from EP 07301009.2, filed Apr. 30, 2007, from EP 06123530.5, filed Nov. 6, 2006, from EP 06121757.6, filed Oct. 4, 2006, from EP 06119316.5, filed Aug. 22, 2006, from EP 06119257.1, filed Aug. 21, 2006, the entire contents of each application is incorporated herein by reference.

FIELD

The present invention relates to:
a control method for a communication network that has a transmitter with an array of transmit antennas and that has at least one receiver communicating with the transmitter;
a receiver module for a communication network with a transmitter having an array of transmit antennas;
a control-signaling method for a receiver in a communication network with a transmitter having an array of transmit antennas for transmission to at least one receiver;
a computer program product, containing executable program code, which is configured to cause a receiver to carry out a control-signaling method for a receiver in a communication network that has a transmitter with an array of transmit antennas for transmission at least to one receiver;
a receiver for a communication network with a transmitter having an array of transmit antennas;
a transmitter control module for a transmitter having an array of transmit antennas for transmission to at least one receiver;
a transmitter having an array of transmit antennas for transmission to at least one receiver;
a transmitter control method for a transmitter having an array of transmit antennas for transmission to at least one receiver;
a computer program product, containing executable program code, which is configured to cause a transmitter having an array of transmit antennas for transmission to at least one receiver to carry out a transmitter control method;
a communication network, comprising a transmitter having an array of transmit antennas for transmission to at least one receiver; and
a control signal for a communication network that has a transmitter with an array of transmit antennas and that has at least one receiver communicating with the transmitter.

BACKGROUND

Multiple-input multiple-output (MIMO) is a technology for next generation wireless systems to enhance the capacity and robustness of the communication link. MIMO technology is based on the presence of multiple transmit antennas and multiple receive antennas in the communication link. Application of MIMO technology is envisioned for cellular communication, broadband wireless access, as well as for wireless local area networks (WLANs). A plurality of two or more transmit antennas is also referred to as an array of transmit antennas herein.

The benefits of MIMO communication are obtained through a combination of antenna arrays that provide spatial diversity from the propagation channel and algorithms that can adapt to the changing multivariate channel.

In future mobile systems and in the long-term evolution of the Universal Mobile Telecommunication System (UMTS LTE) the use of multiple-antenna techniques will become increasingly important to meet spectral efficiency requirements. A significant gain in spectral efficiency can be achieved in a downlink transmission by multiplexing multiple codewords in the spatial domain to either a single user or multiple users sharing the same time-frequency resource block. These single-user or multi-user MIMO schemes exploiting the multiplexing gain of multi-antenna transmission are sometimes referred to as spatial division multiplexing (SDM) and spatial division multiple access (SDMA) techniques. An SDMA scheme enables multiple users within the same radio cell to be accommodated on the same frequency or time slot. The realization of this technique can be accomplished by using an antenna array, which is capable of modifying its time, frequency, and spatial response by means of the amplitude and phase weighting and an internal feedback control.

Beamforming is a method used to create a radiation pattern of the antenna array by constructively adding the phases of the signals in the direction of the communication targets (terminal devices) desired, and nulling the pattern of the communication targets that are undesired or interfering.

In this context, the beamforming vector plays an important role. For purposes of illustration of the meaning of the beamforming vector, in an exemplary single-user communication system employing transmit beamforming and receive combining, assuming that signaling is done using M transmit and N receive antennas, the input-output relationship of this communication system is given by:

$$y = z^H H w x + z^H n$$

where H is a N×M channel matrix connecting the transmitter and the receiver, z is the receive combining vector, $z^H$ is its Hermitian transpose, w is the transmit beamforming vector, x is the transmitted symbol from a chosen constellation, and n is independent noise added at the receiver.

One of the challenges in the design of the beamforming vectors for SDM and SDMA techniques is the need for the base station to know the channels for all the users and receiving antennas of each user. This would require a large amount of feedback to be signaled from the users to the base station.

Solutions have been proposed to reduce this signaling information by introducing a codebook of few possible beamforming matrices. Each user then applies a greedy procedure to select one or more preferred beamforming vectors out of the codebook, by evaluating the Signal-to-Noise-Ratios (SINRs) of different beamforming combinations. Thus, each user has to signal one or several indexes of the preferred vector or vectors, respectively, plus one or more Channel-Quality-Indicator (CQI) values, indicating the corresponding SINRs.

An issue with codebook-based solutions is that the beamforming vectors are not jointly optimized according to the channel conditions. The base station uses the feedback information from the users only to schedule transmission to the set of users reporting the best CQI values.

Alternatively, significant gain in the cell throughput can be achieved if the base station could implement an ad-hoc design of the beamformer. This is possible, for example, if the users report all the channel coefficients, after some quantization operation. However, this requires signaling as many complex values as the product, MN, between the number M of transmit antennas and the number N of receive antennas per user.

SUMMARY

According to a first aspect of the invention a control method for a communication network that has a transmitter with an array of transmit antennas and that has at least one receiver communicating with the transmitter is provided. The method comprises the steps:

A) at the receiver:
performing a channel measurement for a receive antenna of the receiver using a signal transmitted from the transmitter to the receiver;
determining the channel coefficients for each of an array of transmit antennas at the transmitter from an output of the channel measurement;
applying a reversible transform to the channel coefficients, thus ascertaining channel component coefficients indicative of the individual weight of respective channel components in a transform domain;
selecting one or more channel components in the transform domain;
communicating to the transmitter a control signal, which is indicative of either:
1) one or more preferred channel components, derived from the linear decomposition of the vector of channel measurements, and a magnitude of one or more channel components, or, alternatively,
2) one preferred channel component and an estimate of the SINR or, alternatively,
3) one preferred channel component;
B) at the transmitter:
receiving the control signal; and
constructing a beam pattern in the transform domain using the information received from the receiver.

The method of the invention allows an advantageous control of a beamforming process on the transmitter side, based on communicating channel component coefficients indicative of the individual weight of respective channel components in a transform domain from the receiver to the transmitter.

The method overcomes a main issue with codebook-based solutions, namely, that beamforming vectors are not jointly optimized according to the channel conditions. In codebook-based implementations, the transmitter typically uses feedback information from the receivers, like wireless mobile terminal devices, only to schedule transmission to the set of users reporting the best CQI values.

Significant gain in the cell throughput can be achieved by the method of the invention because the transmitter can implement an ad-hoc design of a beamformer. This is possible, because the receiver reports channel component coefficients as defined by the alternatives 1) to 3) above, and preferably in quantized form. In the prior art, this would require signaling as many complex values as the product, MN, between the number of transmit antennas, M, and receive antennas, N, per receiver. In embodiments of the method of the first aspect of the invention, however, it suffices to extract some channel state information (CSI) bits from channel measurements at the receiver side. This information is enough to enable the transmitter, for instance a base station, to design a robust beamforming matrix. The amount of feedback bits required is exactly the same as in the codebook-based techniques.

Note that the terms transmitter and receiver are chosen with reference to the role of the respective device in a communication. Generally, the transmitter of the claims can also take the role of a receiver in a different communication, and the receiver of the claims can also take the role of the transmitter in a different communication. Both devices can be transceiver devices that are configured to perform the method steps associated with the transmitter and configured to perform the method steps associated with the receiver. A preferred configuration for an application of the method of the invention is that of a base station forming the transmitter and a mobile terminal forming the receiver in a MIMO communication network.

In the following, embodiments of the control method of the first aspect of the invention will be described. Unless explicitly described as alternatives, the embodiments can be combined with each other.

In one embodiment performing a channel measurement comprises measuring pilot information transmitted from each of the array of transmit antennas at the transmitter. Preferably, the pilot signals are designed to be orthogonal between each antenna of the array of transmit antennas.

Advantageously, the reversible transformation applied to the channel coefficients is linear and orthogonal; this helps reduce the computational complexity at the receiver. In one embodiment where the reversible transformation applied to the channel coefficients is linear and orthogonal, the transform comprises an Inverse Discrete Fourier Transform (IDFT). The transform domain can be angular domain. The channel components in the transform domain indicate different angles or angular intervals. The channel-component coefficients in this embodiment can take the form of an ordered set of index values, indicating a magnitude associated with an angle or angular interval determined by the index order.

Preferably, thus, the feedback information communicated from the receiver to the transmitter may comprise one or more preferred receiving directions determined from data in the transform domain. This feedback information may be quantized as an integer indexing an angular quantization grid.

In one particular embodiment, the transform is performed in accordance with the equation $$\hat{h}_{a,l} = \frac{1}{\sqrt{M}} \left| \sum_{m=0}^{M-1} \hat{h}_m e^{j2\pi \frac{ml}{L}} \right|, l = 0, \ldots, L-1 \quad (1)$$

This is to be understood as follows: Let $\hat{h}$ denote an M-dimensional vector with components $\hat{h}_m$ of channel measurements that the receiver has derived for a given receiving antenna, for instance by sensing common pilots embedded in a resource block received from the transmitter. Furthermore, M is the number of transmit antennas at the transmitter. It is assumed without restriction that n bits of an uplink signaling channel are reserved for communicating the channel-component coefficients, for instance in the form of index values, such that an angular quantization grid provides $L=2^n$ levels. The receiver or, if multiple receivers are present, each receiver computes an L-point IDFT of $\hat{h}$, and takes the absolute value, i.e. forms a vector $\hat{h}_a$ with elements $\hat{h}_{a,l}$ as given by equation (1). This vector $\hat{h}_a$ represents a quantized version of the angular-domain response amplitude of the channel.

It should be noted that the IDFT is a particular example of a suitable transform. Other transforms could be used that are a linear, reversible and orthogonal.

A further embodiment comprises a step of determining a measure of uncertainty of the channel component coefficients in the transform domain at the receiver after applying the linear and reversible orthogonal transform to the channel coefficients. For example this could be determined from the transformed coefficients in the form of a beamwidth. As another example, this could be determined from the range of variation of sets of channel coefficients or channel component coefficients obtained at different times or at different frequencies.

Another embodiment comprises a step of applying a filter to the channel component coefficients in the transform domain at the receiver. This embodiment forms one way of including the effects of uncertainty in the measured channel coefficients. In the case of the angular domain, use of a smoothing filter is equivalent to including angular uncertainty.

In another embodiment, selecting one or more channel components in the transform domain comprises ascertaining and selecting a channel component that has a channel component coefficient, which forms an either absolute or relative maximum of magnitude in the set of channel component coefficients. With reference to the embodiment, in which the channel component coefficients belong to the angular domain and are indicative of a magnitude in a particular angular direction, the embodiment forms a direction finding technique. Other direction finding techniques could be employed For a beamforming process envisaged, which in one embodiment is based on a covariance matrix of the channel coefficients, the phase of a single peak is not required. In the case of more than one peak, however, the phase difference between peaks would be required in order to enable to correctly recover an estimate of the channel coefficients and/or covariance matrix. A further embodiment therefore comprises:

ascertaining more than one relative maximum of magnitude in the set of component coefficients;

measuring an amplitude of the respective relative maxima;

measuring a phase difference between the channel components forming the relative maxima; and measuring a lower-bound estimate of the signal-to-interference-plus-noise ratio (SINR) given by the following expression. Let $\|\hat{h}\|$ be the Euclidean norm of the vector of channel measurements, and $\hat{h}_a^* = |\hat{h} \cdot \hat{h}_a^*|$ be the modulus of the inner product between the vector of channel measurements and its quantized representation, i.e. the peak amplitude of the function $\hat{h}_{a,l}$. We also define P as the ratio between the transmit power and the thermal noise power at the receiver. Then, the estimate is given by $$SINR = \frac{\frac{P}{M}\hat{h}_a^{*2}}{1 + \frac{P}{M}\left(\|\hat{h}\|^2 - \hat{h}_a^{*2}\right)}.$$

In the case of multiple peaks phase information would be included with the magnitudes in the communicating step.

In one embodiment, communicating the control signal to the transmitter comprises communicating via a radio link, wherein control information comprised by the control signal, as defined in alternatives A), 1) to 3), mentioned above, is preferably provided in quantized form.

In a further embodiment the possible quantized channel representations are stored in a codebook, which would allow more flexibility in the designing the channel quantizer to match the expected channel conditions. To support convenient codebook design, the codebook may be arranged such that the entries form unitary matrices. For any codebook (unitary or not) the selection of a preferred channel representation is made by finding the index of the codebook entry with the highest value of estimated SINR. This corresponds to identifying a preferred codebook index. In estimating the SINR, a range of assumptions may be made about the interference from other transmissions, including the presence of transmissions on other beams and the precoding applied to these transmissions. Preferably these different assumptions would correspond to different decisions at the transmitter, for example to schedule transmissions to different users on different beams. The transmissions on other beams may use precoding selected from a codebook, which would have the advantage of limiting the number of possible beamformers, which would have to be implemented at the transmitter and the number of different possible beams, which would need to be taken into account at the receiver when considering assumptions about interference.

At the receiver, since the codebook index corresponding to the highest estimated SINR will in general depend on the assumed interference, different preferred codebook indices may be determined for different interference assumptions, In the case of a unitary codebook the indices may be constrained to be from the same unitary matrix (which limits the number of possibilities that need to be considered, leading to lower receiver complexity, but lower performance) or allowed to be from different unitary matrices (which is more flexible, but may lead to more signaling overhead to cover the additional possibilities).

In general, to enable the transmitter to decide on the scheduling of transmissions to different users and the transmission details (e.g. bit rate, coding, time/frequency domain resource allocation, use of beamforming/precoding), one or more of preferred codebook indices for different interference assumptions and some or all of the corresponding CQI values may be communicated to the transmitter. The set of assumptions to be considered at the receiver may be predetermined, for example as a part of the system design, or configurable by signaling, since there will in general be a trade-off between increasing performance by considering a wider range of assumptions and the associated additional complexity and signaling overheads (e.g. from sending more indices and CQI values to the transmitter).

For multiple receive antennas receiver, the method of the first aspect of the invention can be extended by executing it once for each of the receive antennas. In one embodiment, therefore, the channel measurement is performed for each of an array of receive antennas at the receiver.

The same procedure can be applied for virtual receive antennas formed by linear combinations of signals from more than one physical antenna.

Preferably, the step of communicating to the transmitter comprises communicating a set of channel quality indicator (CQI) bits.

On the transmitter side, constructing a beam pattern in the transform domain in one embodiment comprises constructing a transmit signal impulse in at least one of the one or more preferred channel components, where the preferred channel component can for instance form preferred angular directions.

In this embodiment, constructing a beam pattern in the transform domain preferably comprises constructing the transmit signal impulse with an amplitude determined according to the magnitude of the channel component coefficients.

Another embodiment further comprises a step of determining a measure of uncertainty in the transform domain of the channel component coefficients at the transmitter after receiving the control signal. Determining a measure of uncertainty in the transform domain of the channel component coefficients at the transmitter can for example comprise evaluating a range of variation of the preferred channel components communicated at different times or at different frequencies.

Another embodiment of the method of the first aspect of the invention comprises applying a filter to the beam pattern in the transform domain. For example, this filter could be determined according to an obtained measure of uncertainty.

Another embodiment comprises designing a beamformer for transmission from the transmitter to the receiver in dependence on the constructed beam pattern in the transform domain. Designing a beamformer can for instance comprise applying an inverse of the linear and reversible orthogonal transform, e.g., a Discrete Fourier Transform (DFT) that forms an inverse to the IDFT mentioned earlier, to the channel component coefficients.

Furthermore, the beamformer design process could be based on coefficients received from more than one receiver. Thus, designing a beamformer is in another embodiment performed in additional dependence on channel component coefficients received from at least one second receiver different from the receiver.

In a further embodiment the beamformer is restricted to be one of a set of pre-coding coefficients from a predetermined codebook. Limiting the flexibility of the pre-coding may lead to lower complexity at the transmitter, and may lead to less signaling overhead (e.g. if the codebook index is signaled to the receiver, rather than unrestricted values of pre-coding coefficients). For convenient design, the codebook may be constructed from unitary matrices.

In an embodiment with codebooks at both transmitter and receiver, the codebooks may be different. This means that the contents and size of these codebooks can be independently designed to optimized the trade-off between such factors as system performance vs. complexity and signaling overhead.

Note that beamforming techniques using the channel covariance matrix do not require the absolute phase of the channel coefficients.

Note that in some cases a channel can be assumed to be reciprocal (or approximately reciprocal) between uplink and downlink, so measurements may then be made in one direction and applied in the other. In this case the following steps would not be required:
 selecting one or more channel components in the transform domain;
 communicating to the transmitter a control signal, which is indicative of either:
  1) one or more preferred channel components, derived from the linear decomposition of the vector of channel measurements, and a magnitude of one or more channel components, or, alternatively,
  2) one preferred channel component and an estimate of the SINR or, alternatively,
  3) one preferred channel component;
 constructing a beam pattern in the transform domain using the information received from the receiver during the communicating step;

Note that a vector quantizer can be applied to the channel measurements, instead of performing the steps:
 selecting one or more channel components in the transform domain;
 measuring an amplitude of respective relative maxima in the set of channel component coefficients;
 measuring a phase difference between the channel components forming the relative maxima.

However, this would involve a higher process complexity, and because phase information is not required in many cases, may involve signaling a larger number of bits.

In a MIMO communication network, a transmitting station selects a beamforming matrix based on feedback information from one or more receiving stations. According to the invention, the feedback information is derived from an Inverse Discrete Fourier Transform (IDFT) of a measure of channel characteristics made on a signal received at the receiving station.

Optionally the feedback information may comprise an indication of peak magnitude of signals in the transform domain.

Optionally the feedback information may comprise an indication of angular uncertainty in the transform domain.

Optionally a filter may be applied to the data in the transform domain.

Alternatively, a different orthogonal transform may be used instead of the IDFT.

According to a second aspect of the invention, a control signaling method for a receiver in a communication network with a transmitter having an array of transmit antennas for transmission of user data to the receiver is provided, comprising:
 performing a channel measurement for a receive antenna of the receiver;
 determining the channel coefficients for each of an array of transmit antennas at the transmitter from an output of the channel measurements;
 applying a reversible transform to the channel coefficients, thus ascertaining channel component coefficients indicative of the individual weight of respective channel components in a transform domain;
 selecting one or more channel components in the transform domain;
 communicating to the transmitter a control signal indicative of either:
  1) one or more preferred channel components, derived from a linear decomposition of a vector formed by the channel coefficients, and a magnitude of the one or more channel components, or, alternatively,
  2) one preferred channel component and an estimate of a quantity indicative of a signal-to-interference-plus-noise ratio SINR, or, alternatively,
  3) one preferred channel component.

Embodiments of the control signaling method of the second aspect of the invention correspond to those above described embodiments of the method of the first aspect of the invention, which further specify method steps performed at the receiver, see also claims 2 to 27.

A third aspect of the invention is a computer program product, containing executable program code, which is configured to implement a control signaling method for a receiver in a communication network that has a transmitter having an array of transmit antennas for transmission of user data to the receiver, the control signaling method comprising the steps:

performing a channel measurement for a receive antenna of the receiver;

determining the channel coefficients for each of an array of transmit antennas at the transmitter from an output of the channel measurements;

applying a reversible transform to the channel coefficients, thus ascertaining channel component coefficients indicative of the individual weight of respective channel components in a transform domain;

selecting one or more channel components in the transform domain;

communicating to the transmitter a control signal indicative either:
1) one or more preferred channel components, derived from a linear decomposition of a vector formed by the channel coefficients, and a magnitude of the one or more channel components, or, alternatively,
2) one preferred channel component and an estimate of a quantity indicative of a signal-to-interference-plus-noise ratio SINR, or, alternatively,
3) one preferred channel component.

In particular, the computer program product can be a receiver control software or a firmware stored on a data medium or implemented in a receiver, or an update software for a previous control software or firmware on a data medium.

Embodiments of the computer program product of the third aspect of the invention contain executable program code, which is configured to implement a control signaling method for a receiver according to embodiments of the method of the first aspect of the invention which further specify method steps performed at the receiver, see also claims 2 to 27.

According to a fourth aspect of the invention, a receiver module for a communication network with a transmitter having an array of transmit antennas is provided. The receiver module comprises:

a channel-measurement unit, which is configured to be connected with a receive antenna of a receiver and configured to perform a measurement of a physical quantity indicative of a channel quality for the receive antenna on the basis of the received signal and to provide an output signal indicative of the measurement result in the form of channel coefficients for each of the array of transmit antennas at the transmitter;

a transform unit, which is connected with the channel-measurement unit and configured to apply a linear and reversible orthogonal transform to the channel coefficients, and to provide at its output channel component coefficients indicative of the individual weight of respective channel components in a transform domain;

a selection unit, which is connected with the transform unit and configured to select one or more channel components in the transform domain on the basis of the channel component coefficients received from the transform unit;

a control unit, which is configured to generate and provide at its output a control signal indicative of either:
1) one or more preferred channel components, derived from a linear decomposition of a vector formed by the channel coefficients, and a magnitude of the one or more channel components, or, alternatively,
2) one preferred channel component and an estimate of a quantity indicative of a signal-to-interference-plus-noise ratio SINR, or, alternatively,
3) one preferred channel component.

The receiver module can form a component of a receiver or an independently traded add-on module to an existing receiver of a previous generation.

In the following, embodiments of the receiver module will be described. The embodiments can be combined with each other, unless stated otherwise explicitly. Further details and advantages of the embodiments can be found in the context of the description of embodiments of the method of the first aspect of the invention, which further specify method steps performed at the receiver.

In one embodiment, the channel-measurement unit is configured to perform a channel measurement by measuring pilot information transmitted from each of the array of transmit antennas at the transmitter.

In another embodiment, the transform unit is configured to apply an Inverse Discrete Fourier Transform to the channel coefficients.

In a further embodiment the channel-measurement unit is further configured to determine a measure of uncertainty of the channel component coefficients in the transform domain.

In another embodiment, the channel-measurement unit is further configured to apply a filter to the channel component coefficients in the transform domain.

In one embodiment, the control unit is configured to generate and provide at its output an uncertainty indicator that forms a measure of uncertainty of a channel component coefficient in the transform domain.

The selection unit is in another embodiment configured to ascertain and select a channel component that has a channel component coefficient, which forms an either absolute or relative maximum of magnitude in the component coefficients received from the transform unit.

In a further embodiment, the selection unit is configured to:
ascertain whether more than one relative maximum of magnitude is present in the set of channel component coefficients received from the transform unit;
measure an amplitude of respective relative maxima in the set of channel component coefficients received from the transform unit;
measure a phase difference between the channel components forming the relative maxima.

The control unit is in one embodiment configured to communicate to the transmitter in quantized form one or more preferred channel components or a magnitude of one or more channel component coefficients via a radio link.

In a further embodiment, the channel-measurement unit is configured to:
be connected with an array of receive antennas; and to
perform the channel measurement for each antenna of the array of receive antennas.

In another embodiment, the control unit is preferably configured to communicate to the transmitter the control signal form in the form of a set of channel quality indicator bits.

According to a fifth aspect of the invention, a receiver for a communication network with a transmitter having an array of transmit antennas is provided, comprising:
at least one receive antenna, which is configured to receive a signal transmitted by the array of transmit antennas of the transmitter;

a receiver module according to claim the fourth aspect of the invention or one of its embodiments described herein.

The receiver comprises in one embodiment an array of receive antennas.

In another embodiment, that can be combined with any of the other embodiments, the receiver forms a mobile terminal device for wireless communication.

In another embodiment, the receiver also comprises a transmitter according a seventh aspect of the invention or one of its embodiments, which will be described below.

According to a sixth aspect of the invention, a transmitter control module is provided, which is configured:

to receive from an external device a control signal indicative either:
1) one or more preferred channel components, derived from a linear decomposition of a vector formed by the channel coefficients, and a magnitude of the one or more channel components, or, alternatively,
2) one preferred channel component and an estimate of a quantity indicative of a signal-to-interference-plus-noise ratio SINR, or, alternatively,
3) one preferred channel component; and to construct and provide at its output beam-pattern control data in the transform domain using the information received from the external device.

The transmitter control module can form a component of a transmitter or an independently traded add-on module to an existing receiver of a previous generation.

In the following, embodiments of the transmitter control module will be described. The embodiments can be combined with each other, unless stated otherwise explicitly. Further details and advantages of the embodiments can be found in the context of the description of embodiments of the method of the first aspect of the invention, which further specify method steps performed at the transmitter.

In one embodiment, the transmitter control module is further configured to:

construct and provide beam-pattern control data for a beam pattern in the form of a transmit signal impulse in at least one of the one or more preferred channel components.

Another embodiment of the transmitter control module further comprises a channel-evaluation unit, which is configured to generate and provide at its output an uncertainty indicator forming a measure of uncertainty of the channel component coefficients in the transform domain.

According to a seventh aspect of the invention, a transmitter is provided, comprising:

an array of transmit antennas; and
a transmitter control module according to the sixth aspect of the invention or one of its embodiments described herein.

In one embodiment the transmitter forms a base station in a mobile-communication network.

In a further embodiment, the transmitter also comprises a receiver according to the fifth aspect of the invention or one of its embodiments.

According to an eighth aspect of the invention, a transmitter control method is provided, comprising the steps:

receiving a control signal indicative of one or more preferred channel components or a magnitude of one or more channel component coefficients, or both, in quantized form;
constructing a beam pattern in the transform domain using information contained in the control signal.

Embodiments of the transmitter control method correspond to those embodiments described in the context of the description of embodiments of the method of the first aspect of the invention, which further specify method steps performed at the transmitter.

According to a ninth aspect of the invention, a computer program product is provided, containing executable program code, which is configured to implement a transmitter control method for a transmitter having an array of transmit antennas for transmission of user data to the receiver, the transmitter control method comprising the steps:

receiving a control signal indicative of one or more preferred channel components or a magnitude of one or more channel component coefficients, or both, in quantized form;
constructing a beam pattern in the transform domain using information contained in the control signal;

Embodiments of the computer program product of the ninth aspect of the invention contain executable program code, which is configured to implement a transmitter control method corresponding to those embodiments described in the context of the description of embodiments of the method of the first aspect of the invention, which further specify method steps performed at the transmitter.

In particular, the computer program product can be a transmitter control software or a firmware stored on a data medium or implemented in a transmitter, or an update software for a previous transmitter control software or firmware on a data medium.

A tenth aspect of the invention is formed by a communication network, comprising a transmitter according to the eighth aspect of the invention or one of its embodiments and a receiver according to the fifth aspect of the invention or one of its embodiments.

The communication network is in one embodiment a cellular wireless network, preferably according to a Universal Mobile Communication Standard. Communication between network entities of the communication network preferably employs a Multiple-input multiple-output (MIMO) technology.

An eleventh aspect of the invention is formed by a control signal for a communication network that has a transmitter with an array of transmit antennas and that has at least one receiver communicating with the transmitter, the control signal comprising control information indicative of either:
1) one or more preferred channel components, derived from a linear decomposition of a vector formed by the channel coefficients, and a magnitude of the one or more channel components, or, alternatively,
2) one preferred channel component and an estimate of a quantity indicative of a signal-to-interference-plus-noise ratio SINR, or, alternatively,
3) one preferred channel component.

The control information can for instance be provided in quantized form.

Embodiments of the invention are also defined in the dependent claims.

BRIEF DESCRIPTION OF THE DRAWINGS

The invention will now be explained in more detail with reference to the drawings in which.

DETAILED DESCRIPTION OF EMBODIMENTS

Figure 1A:
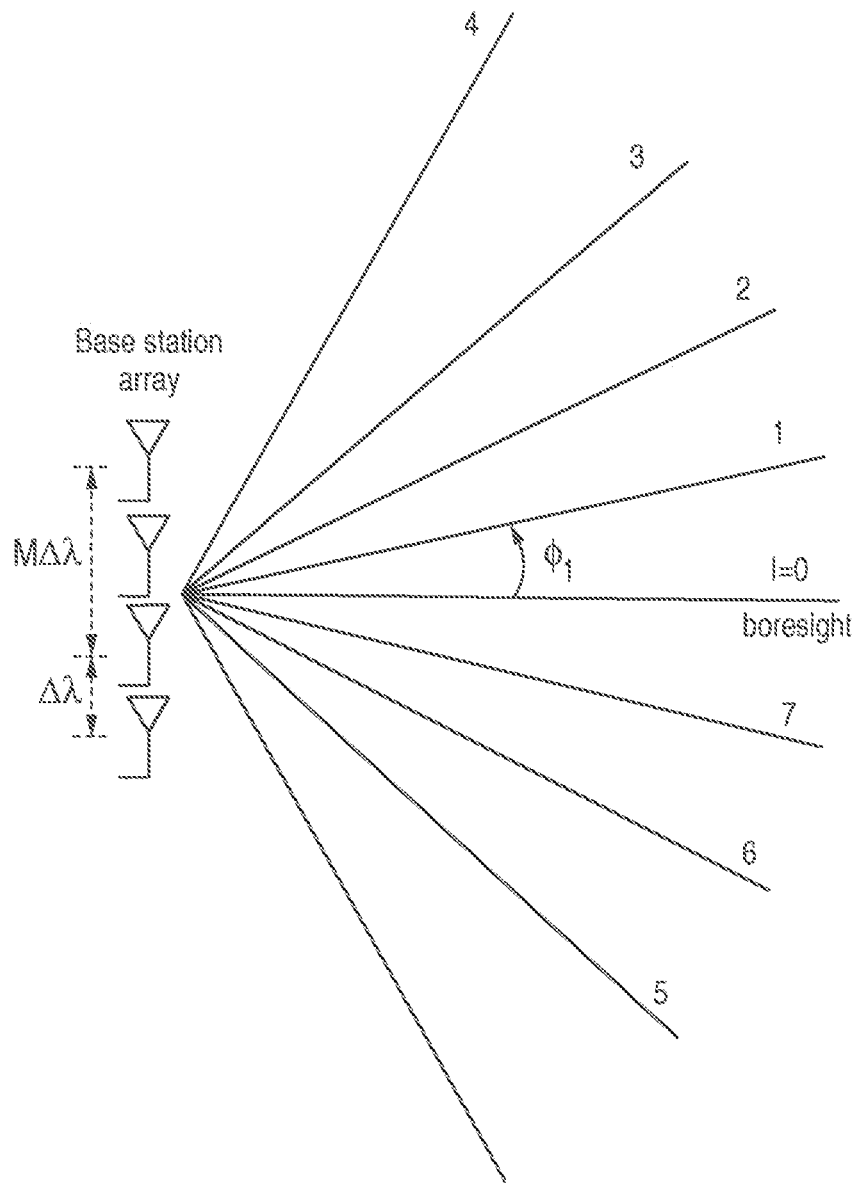
FIG. 1a shows an 8-level angular quantization grid resulting from the calculation of an angular response via an 8-point IDFT.

As an exemplary communication system we consider a cellular downlink transmission towards K receivers, with a single receiving antenna each. The signal at a generic receiver can expressed as $$y_k = h_k \sum_{i=1}^{K} w_i x_i + n_k$$

where $h_k$ is the M-dimensional row-vector with the time-sample channel coefficients 'seen' by user k, $w_i$ are the beamforming vectors which multiplex the data symbols $x_i$ to the M transmit antennas and $n_k$ is the additive noise component. In the following we drop the subscript k denoting a generic user.

Let us indicate with $\hat{h}$ the M-dimensional vector of channel measurements that the receiver, which hereinafter will also be referred to as the terminal, has derived for a given receiving antenna, by sensing the common pilots embedded in the resource block. M is the number of transmit antennas at the transmitter, which hereinafter will also be referred to as the base station or, in short, BS. We assume that n bits of the uplink signaling channel are reserved for reporting the index values, such that the angular quantization grid provides $L=2^n$ levels. Each terminal computes an L-point IDFT of $\hat{h}$, and take the absolute value, i.e. forms a vector $\hat{h}_a$ with elements $$\hat{h}_{a,l} = \frac{1}{\sqrt{M}} \left| \sum_{m=0}^{M-1} \hat{h}_m e^{j2\pi \frac{ml}{L}} \right|, l = 0, \ldots, L-1 \quad (1)$$

This vector represents a quantized version of the angular-domain response amplitude of the channel $\hat{h}$, given by $$\hat{h}_a(\phi) = \frac{1}{\sqrt{M}} \left| \sum_{m=0}^{M-1} \hat{h}_m e^{j2\pi m \Delta \sin\phi} \right| \quad (2)$$

where $\phi$ is the angle formed by a given propagation direction with the boresight of the transmit array, and $\Delta$ is the transmit antenna separation normalized by the carrier wavelength.

The terminal then reports one or more points of the function $\hat{h}_{a,l}$, typically the peak index and the peak value, computed as $$l^* = \arg\max_l \hat{h}_{a,l}$$

$$\hat{h}_a^* = \hat{h}_{a,l^*}$$

Alternatively, the terminal may report an estimate of the SINR, for instance a lower bound estimate of the SINR, provided by:

$$SINR = \frac{\frac{P}{M} \hat{h}_a^{*2}}{1 + \frac{P}{M}\left(\|\hat{h}\|^2 - \hat{h}_a^{*2}\right)}$$

Reporting the lower-bound estimate of the SINR brings a surprisingly high efficiency to the method and system of the invention, as witnessed from numerical simulation results. This reporting can be done for instance with help of some of the bits of channel quality indicator bits (CQI).

This estimate can be made under a plurality of assumptions. For example, this estimate could be done under the assumption that the transmitter forms the beam pattern by using zero forcing beamforming.

In addition, the terminal may report an estimate of the angular spread, by measuring the width of the peak lobe. This can be signaled, for example, by reporting the number of points of $\hat{h}_{a,l}$ falling within 3 dB attenuation at either side of the peak (see the example hereafter).

Note that the transformation for the angular-domain representation of the channel measurements is an IDFT because of the geometry of the transmit array, which is assumed to be an ULA (uniform linear array). Different geometries imply different transformations from the spatial to the angular domain. However, the terminal could still be reporting channel measurements in terms of angular indices, under the assumption of a transmit ULA, independently of the actual array geometry. It is, then, up to the BS to associate these indices with the correct angles and corresponding unit spatial signatures, depending on the array geometry. This step may be needed for the BS to be able to steer a beam in the correct angular direction.

Note that the terminal does not need to know the antenna spacing at the transmitter. However, this parameter is known to the BS, hence it can associate the reported peak index with a physical propagation angle. In fact, the IDFT operation encompasses a uniform quantization of the directional sine, $\Omega=\sin\phi$, with step size $$\frac{2}{L} = \frac{1}{2^{n-1}}.$$

As a consequence the quantization on the angle $\phi$ is non-uniform. Angles are more finely quantized around the boresight ($\phi=0$) than near the direction of the array broadside. This is a desirable property as an uniform linear array (ULA) has maximum angular resolution, approximately equal to $$\frac{1}{M\Delta}$$

radians, along the boresight.

The angular information is derived by the BS as follows $$\phi^* = \arcsin\frac{l^* - \text{fix}\left(\frac{2(l^*-1)}{L}\right)L}{L\Delta}$$

where 'fix' denotes the round-towards-zero operation.

Note that if the antennas are densely spaced ($\Delta<\frac{1}{2}$) the equation above may have no solution. However, this is a case of very little practical interest, as the antenna arrays are usually designed with $\Delta\geq\frac{1}{2}$ for maximum uncorrelation properties. Moreover, as the antenna spacing decreases below half a wavelength, the radiation pattern becomes close to that of an omnidirectional antenna, and the directional information becomes less significant.

In the following, an example will be described with reference to FIGS. 1a through 2b in parallel.

Let us consider a 4-antenna ULA covering a 120° cell sector. The normalized antenna spacing is set to $\Delta=1/\sqrt{3}$. The number of bits reserved for signaling the angular index is fixed to n=3, thus L=8.

Figure 1B:
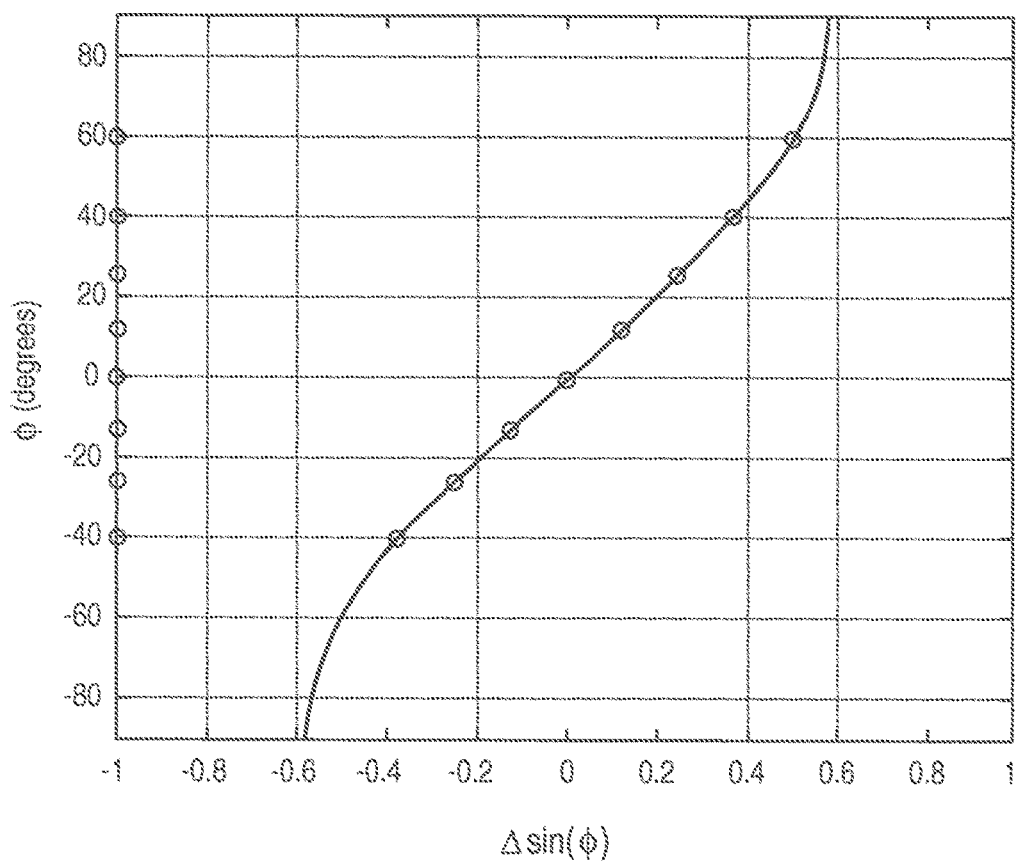
FIG. 1b illustrates the quantization diagram.
Figure 2A:
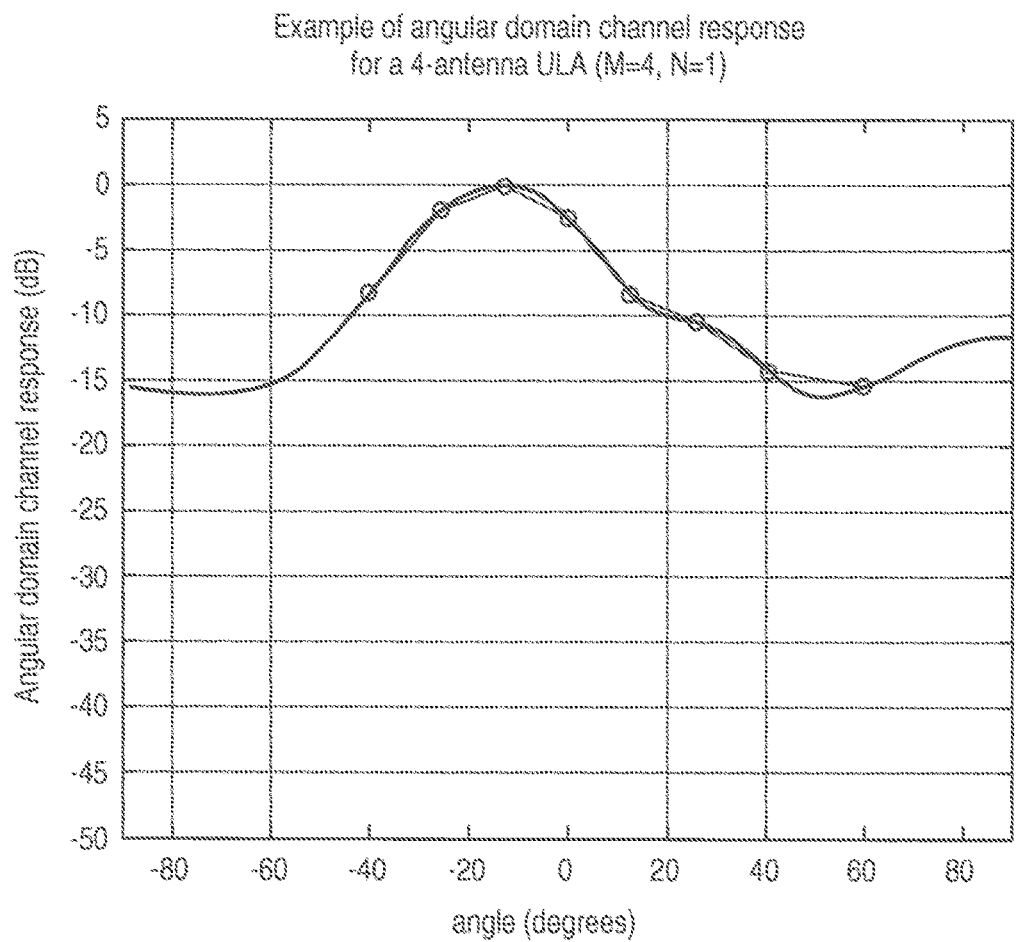
FIGS. 2a and 2b show the amplitude of the angular domain response of a channel realization, normalized by the peak value, in a Cartesian and polar plot, respectively.
Figure 2B:
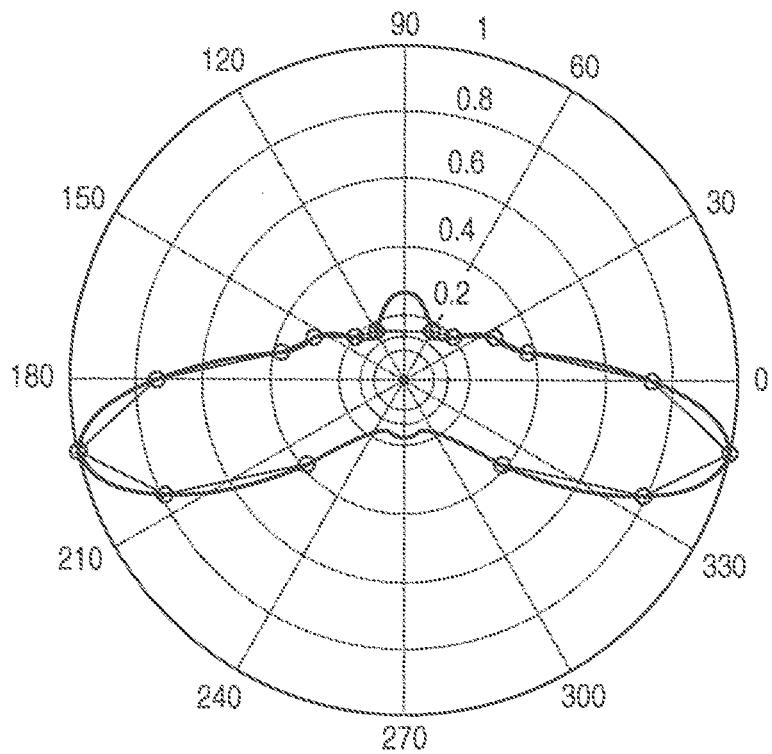

FIG. 1a shows an 8-level angular quantization grid resulting from the calculation of the angular response via an 8-point IDFT. FIG. 1b illustrates the quantization diagram. Note that the directional sine is uniformly quantized. FIGS. 2a and 2b show the amplitude of the angular domain response of a channel realization (normalized by the peak value) in a Cartesian and polar plot, respectively. Bullets represent the quantized version computed by eq. (1), while the solid line denotes the function of eq. (2). Note that in order to plot the angular response, knowledge of the antenna spacing is needed, which is necessary to associate the IDFT indices to angular values.

Figure 3:
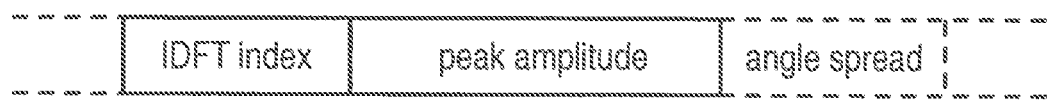
FIG. 3 shows a format of a control signal used in an uplink signaling channel.

FIG. 3 shows a format of a control signal S in an uplink signaling channel as proposed herein: the first 3 bits are used to report the IDFT index, which is 7 (111) in the example, corresponding to the peak of the angular domain response. The second field contains the value of the amplitude of the angular response at the peak. The third optional field contain an indication of the angular spread: for example the terminal can count the number of IDFT points with amplitude within 3 dB of the peak value, at either side of the peak. In the example this number is 1 (001). The BS can then derive an estimate of the angular spread of the main lobe at 3 dB, which is roughly 25° as can be seen from FIG. 2a.

Numerical Results

We have compared the channel vector quantization (CVQ) technique and PU2RC in terms of average throughput and average number of active users per sub-carrier use, where average is w.r.t. the ensemble of independently generated channel matrices H. We have considered two different channel models.

Independent Rayleigh fading. The elements of H are i.i.d. proper Gaussian random variables ~CN(0,1). This model generates completely uncorrelated channels in space for each user.

3GPP spatial channel model (SCM) [13]. We report results for two opposite scenarios.

Sub-urban macro, with a single path propagation (briefly, SCM-SM1Path). This models a very spatially-correlated channel for each user, with nearly line-of-sight propagation.

Urban micro, with 10-path propagation (briefly, SCM-Um10Path). This simulates a rich scattering environment with low spatial correlation.

We consider the case of M=4 transmit antennas and K=20 single-antenna users. We assume that CSI from the UE's is sent to the Node B on zero-delay, error-free feedback channels and that each UE has perfect knowledge of its channel and no knowledge of the others'. Moreover, we assume that a codebook of NM-dimensional vectors is known to both the Node B and the UE's, and that each UE feeds back a log(N) bit index and an analog (i.e. unquantized) real CQI value.

As a baseline reference to evaluate the spatial multiplexing gain of the MU-MIMO techniques, we consider a TDMA-type of system where for each channel instance the transmitter selects the user with the best achievable rate. In this baseline system each UE performs channel vector quantization and reports the quantization index and the following: CQI $$CQI_{k,TDMA} = \|h_k\|^2 \cos^2\theta_k.$$

The beamforming vector, $g_k$ is given by:

$$g_{k,TDMA} = P\hat{h}_k^H,$$

and the user rate:

$$R_{k,TDMA} = \log(1 + P \cdot CQI_{k,TDMA})$$

is achievable. The multiplexing gain—defined as the limit of the ratio R/log$_2$(SNR) for high SNR—of this baseline system is one, independently of the level of CSI available at the transmitter. The accuracy of the quantization in this TDMA system only affects the SNR offset w.r.t. the perfect CSI curve.

For comparison, we have also plotted the dirty paper coding (DPC) sum-rate capacity curve and the achievable throughput for ZF beamforming with water-filling power allocation across users (briefly, ZFWF), with greedy user selection and perfect CSI available at the transmitter.

Figure 4:
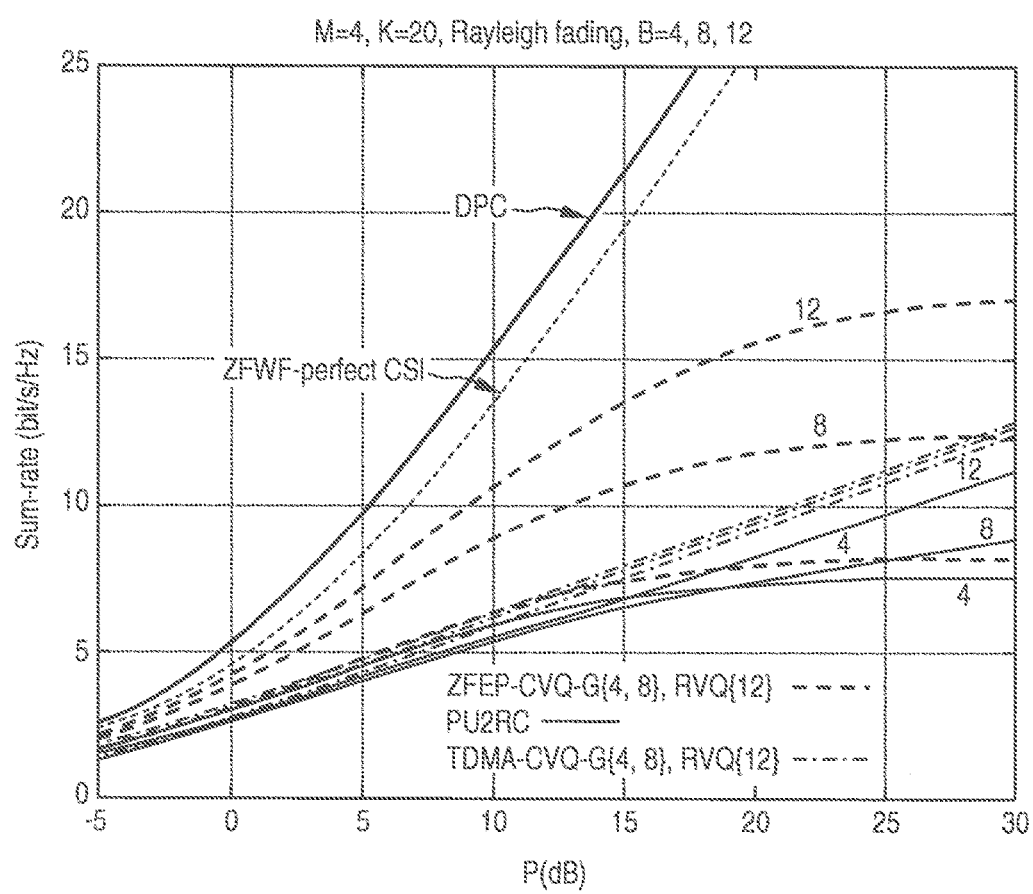
FIGS. 4 to 9 show numerical results of simulating the system and method.
Figure 5:
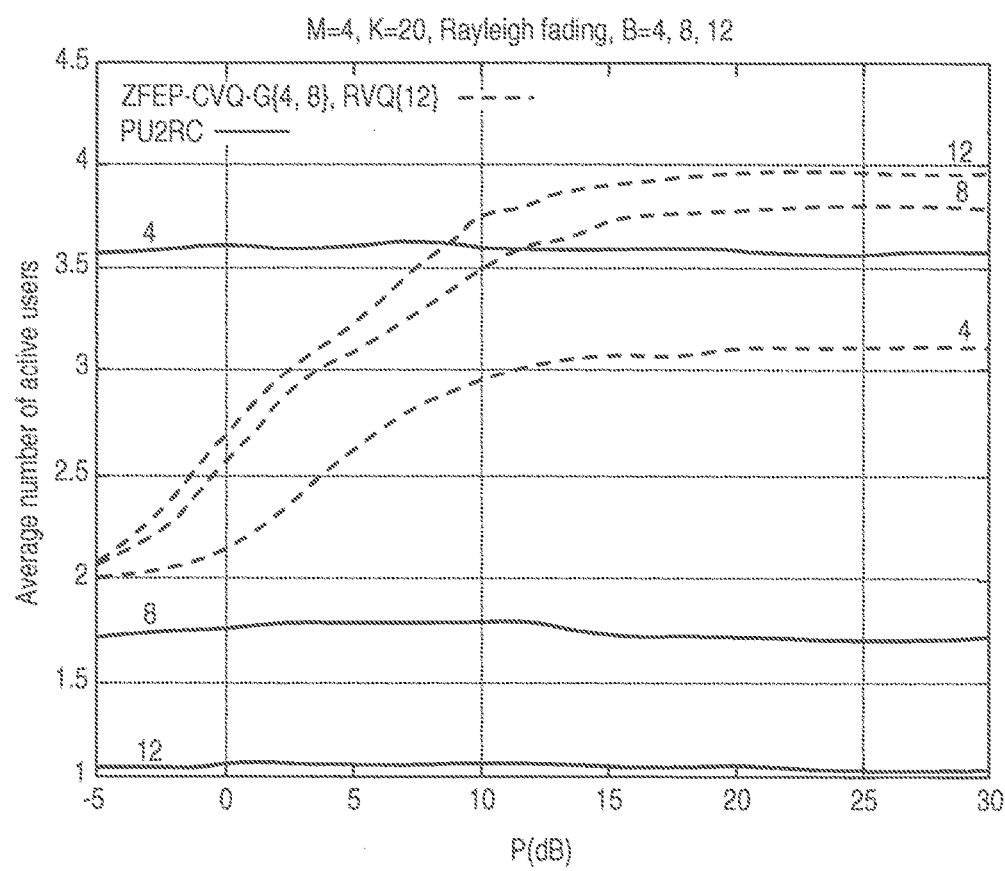

The first case (FIG. 4) is the Rayleigh fading channel model, i.e. spatially uncorrelated channels, with B=4,8 and 12 quantization bits. For the CVQ technique and the baseline TDMA, we have used Grassmannian codebooks G(4,1,16) and G(4,1,256) for B=4 and 8 bits respectively, while RVQ is used for B=12 bits. We have tried RVQ also for fewer quantization bits and performance is, within a fraction of dB, close to the Grassmannian codebooks. We recall that the Grassmannian codebooks have been generated by random search amongst vectors isotropically distributed in the M-dimensional complex unit sphere. We can see that PU2RC performance loses out to TDMA and CVQ for all SNR and quantization levels. For 8-bit quantization and upwards, the CVQ technique, with either Grassmann codebooks or RVQ, provides the best performance in the whole SNR range. One clear issue with a PU2RC-type of scheme is that the multiplexing gain is bounded above by one in the limit of large codebooks. This is because, if p=1/L=M/$2^B$ is the probability that a user selects a given beamforming matrix in the codebook, the probability of 1 out of K users selecting the same matrix is a binomial random variable with parameters (p, K), β(p, K), and mean value $\bar{I}$ =Kp. Hence the average number of users selecting the same beamforming matrix decreases exponentially with the number of quantization bits B. Eventually, for large B, if K is kept constant, only a single user will ever be allocated. This can be clearly seen in FIG. 5 where the average number of active users is plotted versus SNR. On the other hand user allocation for CVQ gradually increases with the SNR and with B up to a maximum of 4.

Figure 6:
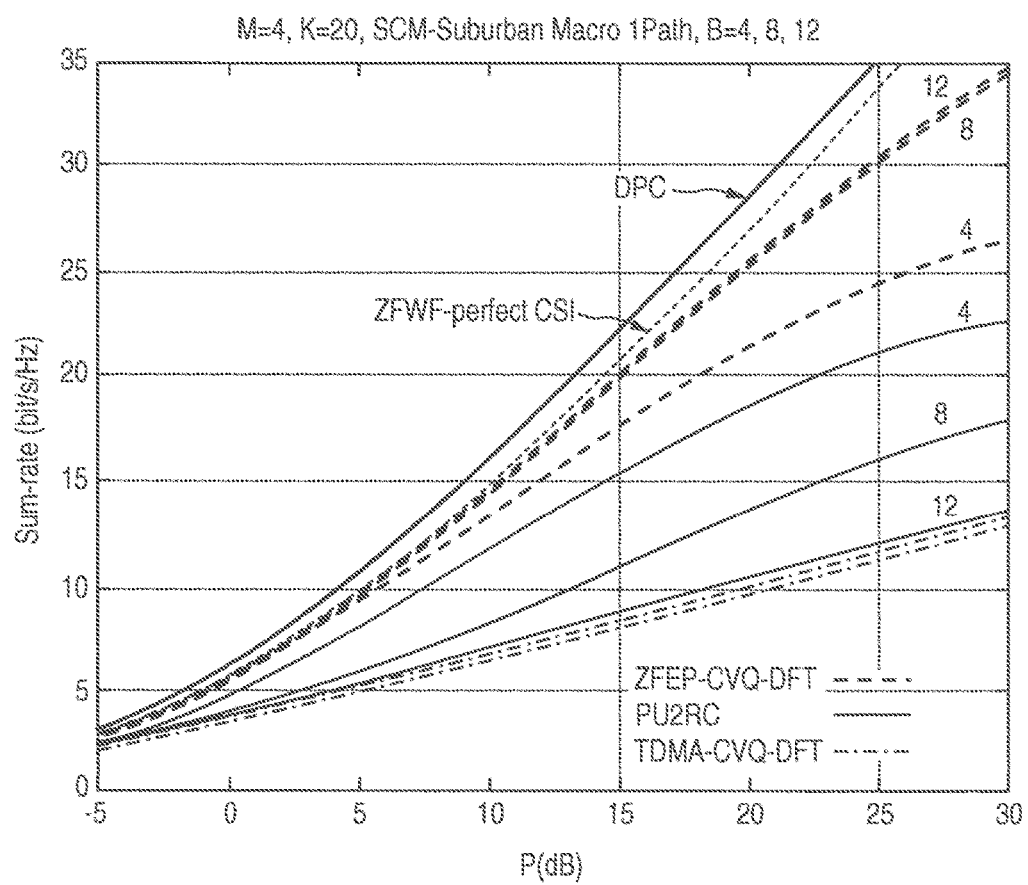
Figure 7:
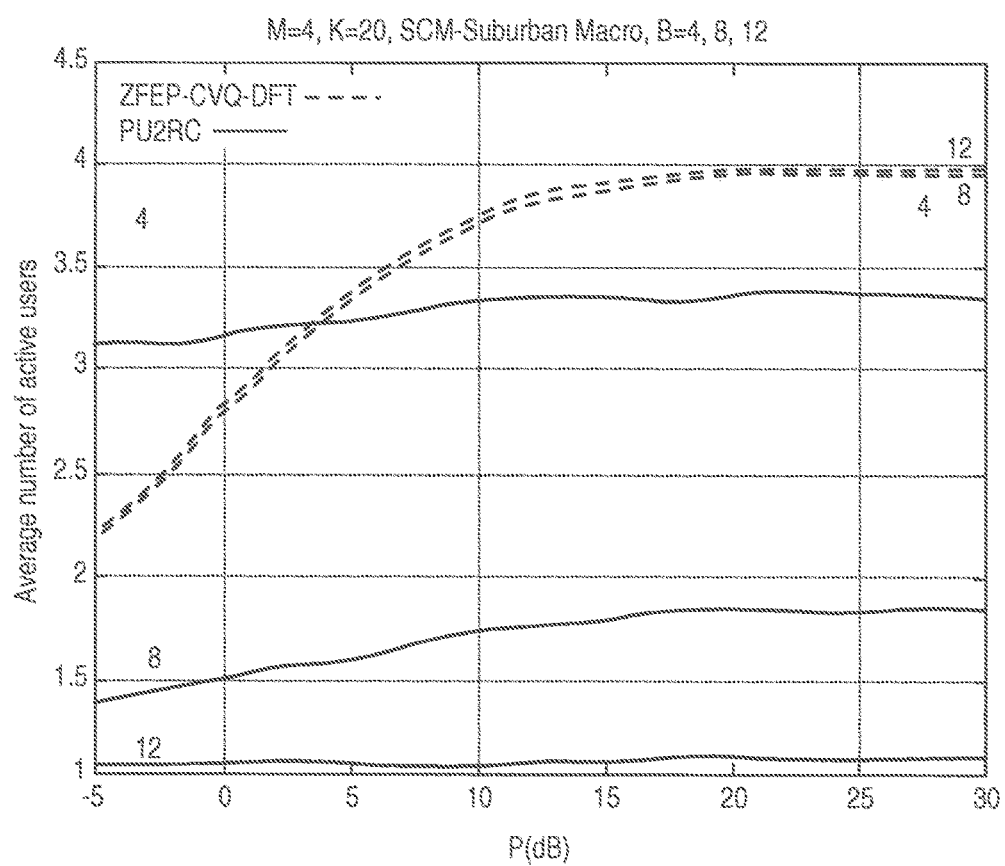
Figure 8:
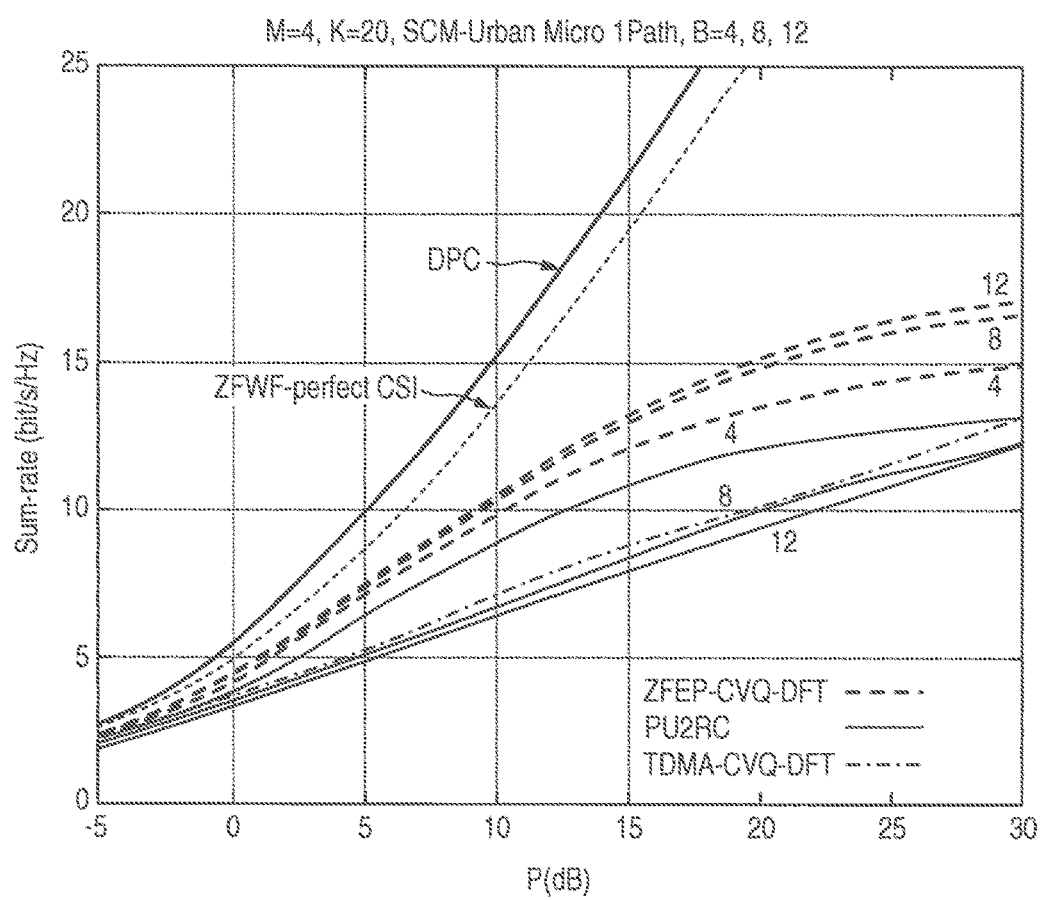
Figure 9:
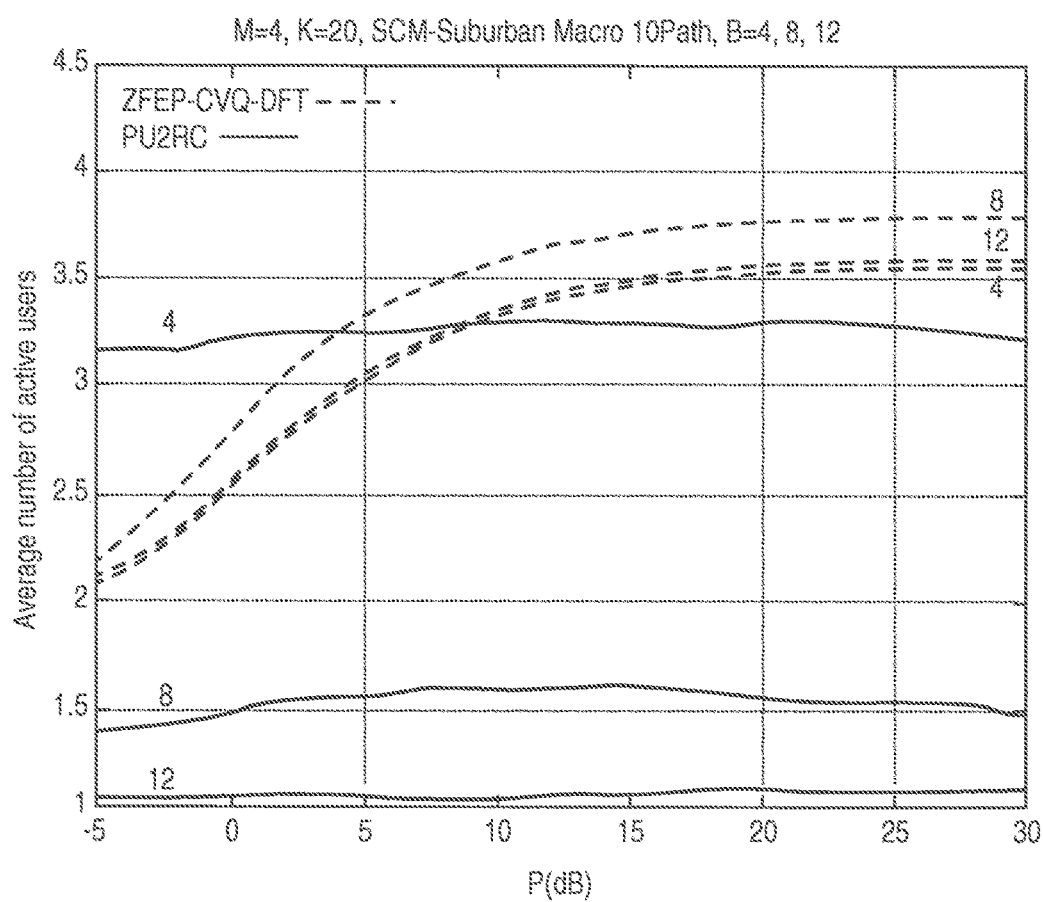

In FIGS. 6 and 8 the SCM channel model is evaluated with the "sub-urban macro" scenario and one propagation path (SCM-SMPath1 for short), and the "urban micro" scenario, ten paths (SCM-UmPath10 for short), respectively. The SCM-SMPath1 channel models a nearly line-of-sight propagation condition with local scattering at the receivers and very high spatial correlation. The SCM-UmPath10 models a rich scattering urban scenario. Because of the spatial correlation, i.e. "directional" properties in the angular domain, of these two channels, Grassmannian and random codebook are not well suited. In fact, these codebooks are designed specifically for uncorrelated channel vectors whose direction is isotropically distributed in the M-dimensional unit sphere. The correlation properties of the SCM channel are better captured by a Fourier codebook. Such a codebook structure is used for the CVQ scheme and TDMA in FIGS. 6-9. We note that vector quantization using such codebook can be done very efficiently by DFT-transform. Moreover, the entire codebook need not be stored in memory as the vector quantization operation boils down to a simple Fourier transform. In FIGS. 7 and 9 the average number of allocated users is shown for the SCM-SMPath1 and SCM-UmPath10 channel models, respectively.

Figure 10:
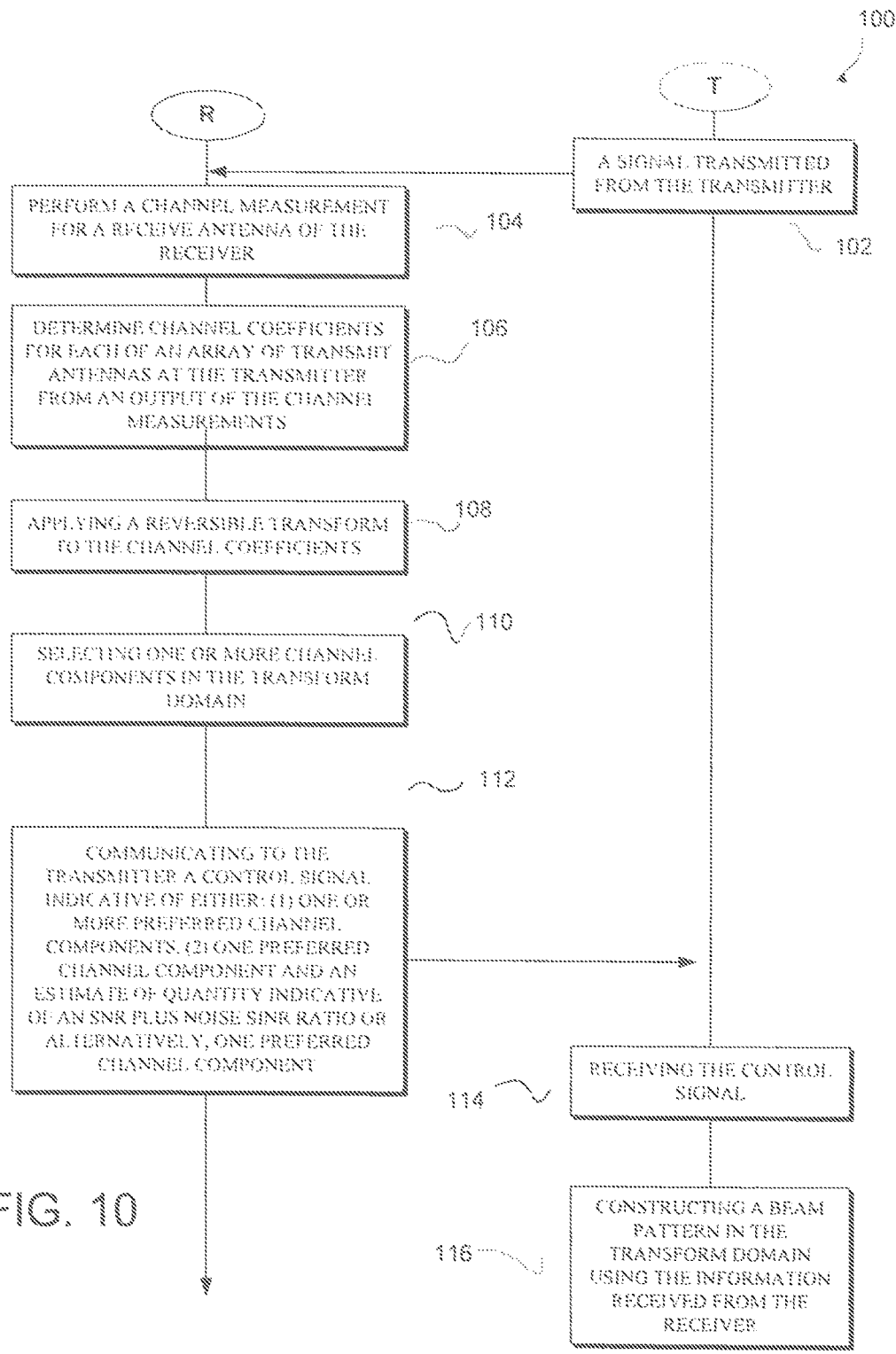
FIG. 10 shows a flow diagram of an embodiment for a control method for a communication network that has a transmitter with an array of transmit antennas and a receiver communicating with the transmitter.

FIG. 10 shows a flow diagram of an embodiment for a control method 100 for a communication network that has a transmitter T with an array of transmit antennas and a receiver R communicating with the transmitter T.

In one implementation, the transmitter T is a Node B provided with MIMO technology in a cellular communication network according to the UMTS standards, and the receiver R is a mobile terminal attached to the communication network via the Node B. In such an implementation there would typically be more than one mobile terminal each with a receiver, but the method is described principally by reference to one receiver in one mobile terminal.

Structural details of the transmitter T and the receiver R will be described with reference to FIGS. 11 and 12. For the purpose of the present embodiment, only the transmitter characteristics of the base station will be discussed. However it is understood that a Node B typically also comprises a receiver portion.

In the flow diagram of FIG. 10, method steps performed at the receiver R side and at the transmitter T side are shown in different branches of the flow diagram, labeled accordingly. The method steps performed on each side form respective individual control methods for the transmitter and the receiver, respectively.

The method 100 is started with the transmitter sending pilot information through each of the array of transmit antennas provided at the transmitter side, in step 102. The pilot signals are orthogonal between each antenna of the array of transmit antennas. The pilot signals transmitted to the receiver are used on the receiver side to perform channel measurements for a receive antenna of the receiver, at step 104. Subsequently, at step 106, channel coefficients are determined for each element of the array of transmit antennas of the transmitter T from the output of the channel measurement.

Subsequently, the determined channel coefficients are subjected to a reversible transform so as to obtain channel component coefficients, which are indicative of an individual weight of respective channel components in the transform domain, at step 108. An example of a suitable reversible transform is an Inverse Discrete Fourier Transform (IDFT). However, other reversible transforms can be used. Linear and orthogonal transforms are preferred because they reduce the computational complexity at the receiver. The transform domain in the present embodiment is an angular domain such that the channel components in the transform domain indicate different angles or angular intervals. Thus, the channel component coefficients determined in this embodiment form an ordered set of magnitude values associated with an angle or angular interval determined by an index order.

Subsequently, at step 110, the receiver R selects one or more of the channel components in the transform domain. In this selecting step, the receiver ascertains and selects a channel component that has a channel component coefficient, which forms either an absolute or a relative maximum of magnitude in the set of channel component coefficients. In step 112, the receiver R provides one or more preferred channel components, which are derived from the linear decomposition of the vector of channel measurements, and a magnitude of one or more channel components to the transmitter. In an alternative embodiment, the receiver communicates to the transmitter a control signal indicative of one preferred channel component and an estimate of a signal-to-interference-plus-noise ratio (SINR). In a further alternative embodiment, the receiver communicates to the transmitter control signal indicative of one preferred channel component.

In a step 114, the transmitter T receives the control signal, and, at step 116, it constructs a beam pattern in the transform domain using the information received from the receiver R, with which step the method ends. In an embodiment with more than one receiver R, the beam pattern may be constructed using information from more than one receiver.

Figure 11:
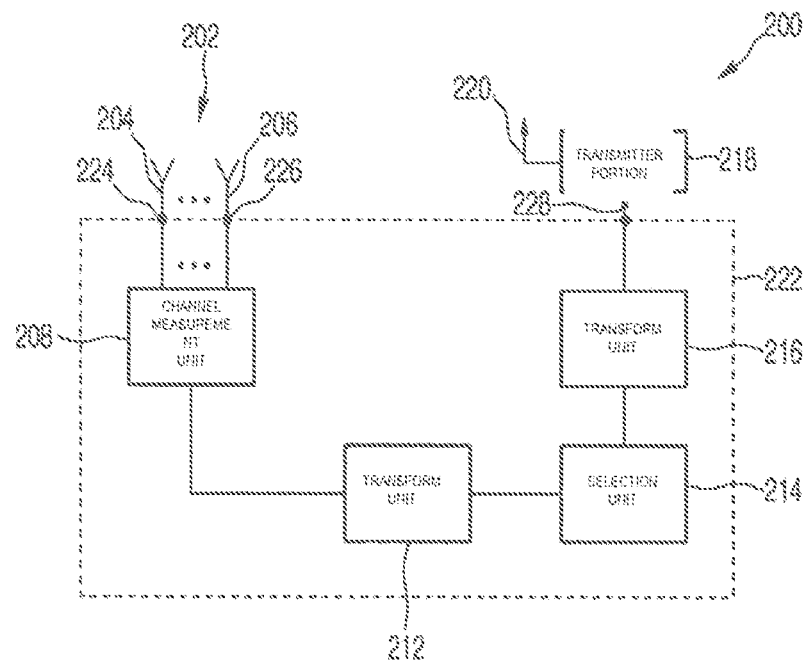
FIG. 11 shows a block diagram of an embodiment of a receiver suitable for performing the operations of the receiver in the control method of FIG. 10.

FIG. 11 shows a simplified block diagram of an embodiment of a receiver 200 suitable for performing the operations of the receiver in the control method of FIG. 10. The receiver of FIG. 11 is shown only in that amount of detail, which is relevant for explaining the features of the technology disclosed by the present application. Known functionalities of a receiver for operation in a MIMO communication network are not shown for the sake of simplicity and conciseness of the present specification.

The receiver 200 is designed for operation in the communication network described with reference to FIG. 10 and for performing a control-signaling method for a receiver that corresponds to the method steps performed by the receiver R in FIG. 10. The receiver 200 has an array 202 of receive antennas, of which two receive antennas 204 and 206 are shown. In an alternative embodiment, the receiver 200 has only one receive antenna.

The receiver 200 has a channel measurement unit 208, which on its input side is connected with the array of receive antennas 202. The channel-measurement unit 208 is on its output side connected with a transform unit 212. The transform unit 212 is connected with a selection unit 214, which in turn is connected with a control unit 216. The control unit is connected with a transmitter portion 218, which is connected on its output side with a transmit antenna 220. The units 208 to 216 can take the form of a receiver module 222, which can be used to update existing receiver structures with the technology described herein. As such, the receiver module 222 will have input and output ports 224, 226, and 228.

In operation, the channel-measurement unit 208 performs a measurement of a channel coefficients for each of the array of transmit antennas at the transmitter on the basis of the received signal. The received signal used by the channel measurement unit is typically a pilot signal containing pilot information received from a MIMO transmitter (in the example of FIG. 10: the Node B) via an array of transmit antennas of a MIMO transmitter. The channel measurements are performed for each antenna of the array of receive antennas 202.

Channel coefficients obtained from the channel measurements are fed to the transform unit 212, which performs a reversible transform to the channel coefficients, preferably a linear and orthogonal transform, which is suitably a IDFT. The transform unit provides at its output channel component coefficients to the selection unit 214. The channel component coefficients indicate an individual weight of the respective channel components in the transform domain, which, as explained is suitably an angular domain. The selection unit 214 selects one or more channel components in the transform domain on the basis of the channel component coefficients received from the transform unit. The selection is suitably based on a criterion, which allows to determine either an absolute or a relative maximum of magnitude in the channel component coefficients received from the transform unit 212. The selection unit then provides the selected channel component information to the control unit 216. The control unit 216 forwards to the transmit portion 218 one or more preferred channel components, as selected by the selection unit 216, or a magnitude of one or more channel component coefficients, or both. In an alternative embodiment, the control unit provides one preferred channel component, as selected by the selection unit 216, and an estimate of the SINR. This information is processed by the transmit portion 218 for transmitting it to the transmitter (not shown in FIG. 11) via the transmit antenna 220.

Figure 12:
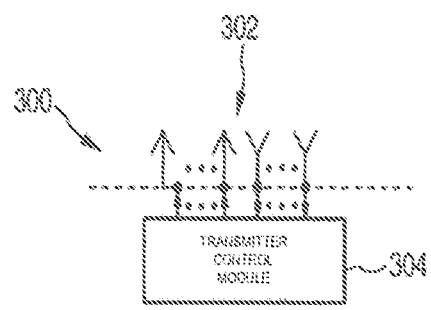
FIG. 12 shows a schematic block diagram of a transmitter suitable for performing the operations of the transmitter in the control method of FIG. 10.

FIG. 12 shows a simplified block diagram of a transmitter 300 suitable for performing the operations of the transmitter in the control method of FIG. 10. The transmitter 300 of FIG. 12 is shown in only an amount of detail, which is relevant for explaining the features of the technology disclosed by the present application. Known functionalities of a transmitter for operation in a MIMO communication network are not shown for the sake of simplicity and conciseness of the present specification.

The transmitter 300 has an array 302 of transmit antennas and receive antennas, which are shown as a single combined array in FIG. 12. The transmitter further has a transmitter control module 304, which is configured to receive from the receive antennas a control signal indicative of one or more preferred channel components and a magnitude of the one or more channel components.

The control signal has been described with reference to FIGS. 3, 10 and 11 in further detail. In an alternative embodiment, the received control signal is indicative of one preferred channel component and an estimate of the SINR.

From the received information, the transmitter-control unit 304 constructs beam-pattern control data in the transform domain and provides it to the antenna array 302 in the form of transmit control signals to be used during transmission of data to a receiver, from which the external control signal indicative of the one or more preferred channel components were received. Those functional blocks of the transmitter, which are responsible for generation of transmit signals to be fed to the MIMO antenna array 302 are omitted in the block diagram of FIG. 12.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

In the claims, the word "comprising" does not exclude other elements or steps, and the indefinite article "a" or "an" does not exclude a plurality.

The invention claimed is:

1. A method performed by a wireless apparatus for developing a feedback signal comprising:
    developing a quantized version of an angular-domain response amplitude vector of channel between a transmitter having a plurality of transmit antennas and a receiver, wherein an absolute value of one or more channel components of the angular-domain response amplitude vector in the angular domain is indicative of a magnitude in a particular angular direction;
    transmitting as the feedback signal, information indicative of at least one selected point of the angular-domain response amplitude vector of the channel and information related to a magnitude of the at least one selected point, wherein the information of the feedback signal is useable by the transmitter to construct a beam pattern in a transform domain; and
    determining a measure of uncertainty of the channel components.

2. The method of claim 1, wherein developing a quantized version of an angular-domain response amplitude vector further comprises:
    directly applying a reversible transform to determined channel coefficients.

3. The method of claim 2, wherein the reversible transform is linear and orthogonal.

4. The method of claim 2, wherein the reversible transform is an inverse discrete Fourier transform (IDFT).

5. The method claim 1, wherein the at least one selected point is a channel component.

6. The method of claim 1, wherein the information related to a magnitude of the at least one selected point is information indicating the respective magnitudes of the at least one selected point.

7. The method of claim 1, wherein only one point is selected and the information related to a magnitude of the at least one selected point is a signal to interference and noise ratio (SINR).

8. The method of claim 1, wherein developing a quantized version of an angular-domain response amplitude vector further comprises:
    performing a channel measurement for at least one antenna of the receiver using a signal received from at least one of the transmit antennas at the at least one receiver antenna.

9. The method of claim 8, wherein developing a quantized version of an angular-domain response amplitude vector further comprises:
    determining channel coefficients for each of the transmit antennas based on the channel measurement.

10. The method of claim 9, further comprising:
    directly applying a reversible transform to the determined channel coefficients to develop the one or more channel components of the vector in the angular domain.

11. The method of claim 8, wherein performing a channel measurement further comprises measuring pilot information received from each of the plurality of transmit antennas.

12. The method of claim 1, further comprising applying a filter to the at least one channel component in the transform domain at the at least one receiver.

13. The method of claim 1, wherein the feedback signal further comprises information indicative of the measure of uncertainty.

14. The method of claim 1, wherein the at least one selected point is a channel component that forms one of an absolute or a relative maximum of magnitude in the angular-domain response amplitude vector.

15. The method of claim 1, further comprising:
ascertaining more than one relative maximum of magnitude of the channel components;
measuring an amplitude of the respective relative maxima; and
measuring a phase difference between the channel components forming the relative maxima.

16. A non-transitory computer readable medium having stored thereon instructions for causing one or more processing units to perform the developing, transmitting and determining as recited in claim 1.

17. A wireless apparatus for developing a feedback signal comprising:
a radio circuit;
a memory; and
a processing circuit coupled to the radio circuit and the memory, the processing circuit is configured to:
develop a quantized version of an angular-domain response amplitude vector of a channel between a transmitter having a plurality of transmit antennas and a receiver, wherein an absolute value of one or more channel components of the angular-domain response amplitude vector is indicative of a magnitude in a particular angular direction;
cause a transmission, by the radio circuit, as the feedback signal, of information indicative of at least one selected point of the angular-domain response amplitude vector of the channel and information related to a magnitude of the at least one selected point, wherein the information of the feedback signal is useable by the transmitter to construct a beam pattern in a transform domain; and
determine a measure of uncertainty of the channel components.

18. The wireless apparatus of claim 17, wherein to develop the quantized version of the angular-domain response amplitude vector the processing circuit is further configured to apply a reversible transform to determined channel coefficients.

19. The wireless apparatus of claim 18, wherein the reversible transform is linear and orthogonal.

20. The wireless apparatus of claim 18, wherein the reversible transform is an inverse discrete Fourier transform (IDFT).

21. The wireless apparatus of claim 17, wherein the at least one selected point is a channel component.

22. The wireless apparatus of claim 17, wherein the information related to a magnitude of the at least one selected point is information indicating the respective magnitudes of the at least one selected point.

23. The wireless apparatus of claim 17, wherein only one point is selected and the information related to a magnitude of the at least one selected point is a signal to interference and noise ratio (SINR).

24. The wireless apparatus of claim 17, wherein to develop the quantized version of the angular-domain response amplitude vector the processing circuit is further configured to perform a channel measurement for at least one antenna of the receiver using a signal received from at least one of the transmit antennas at the at least one receiver antenna.

25. The wireless apparatus of claim 24, wherein to develop the quantized version of the angular-domain response amplitude vector the processing circuit is further configured to determine channel coefficients for each of the transmit antennas based on the channel measurement.

26. The wireless apparatus of claim 24, wherein to develop the quantized version of the angular-domain response amplitude vector the processing circuit is further configured to determine channel coefficients for each of the transmit antennas based on the channel measurement and to directly apply a reversible transform to the determined channel coefficients to develop the one or more channel components of the vector in the angular domain.

27. The wireless apparatus of claim 24, wherein to perform a channel measurement the processing circuit is further configured to measure pilot information received from each of the plurality of transmit antennas.

28. The wireless apparatus of claim 17, wherein the processing circuit is further configured to apply a filter to the at least one channel component in the transform domain at the at least one receiver.

29. The wireless apparatus of claim 17, wherein the feedback signal further comprises information indicative of the measure of uncertainty.

30. The wireless apparatus of claim 17, wherein the at least one selected point is a channel component that forms one of an absolute or a relative maximum of magnitude in the angular-domain response amplitude vector.

31. The wireless apparatus of claim 17, wherein the processing circuit is further configured to:
ascertain more than one relative maximum of magnitude of the channel components;
measure an amplitude of the respective relative maxima; and
measure a phase difference between the channel components forming the relative maxima.

32. An apparatus integrated in a communication device, the apparatus configured to develop a feedback signal:
a control circuit; and
memory coupled to the control circuit, wherein
the control circuit is configured to:
develop a quantized version of an angular-domain response amplitude vector of a channel between a transmitter having a plurality of transmit antennas and a receiver, wherein an absolute value of one or more channel components of the angular-domain response amplitude vector in the angular domain is indicative of a magnitude in a particular angular direction;
cause a transmission, by the communication device, as the feedback signal, information indicative of at least one selected point of the angular-domain response amplitude vector of the channel and information related to a magnitude of the at least one selected point, wherein the information of the feedback signal is useable by the transmitter to construct a beam pattern in a transform domain; and
determine a measure of uncertainty of the channel components.

33. The apparatus of claim 32, wherein to develop the quantized version of the angular-domain response amplitude vector the memory further contains instructions to directly apply a reversible transform to determined channel coefficients.

34. The apparatus of claim 33, wherein the reversible transform is linear and orthogonal.

35. The apparatus of claim 33, wherein the reversible transform is an inverse discrete Fourier transform (IDFT).

36. The apparatus of claim 32, wherein the at least one selected point is a channel component.

37. The apparatus of claim 32, wherein the information related to a magnitude of the at least one selected point is information indicating the respective magnitudes of the at least one selected point.

38. The apparatus of claim 32, wherein only one point is selected and the information related to a magnitude of the at least one selected point is a signal to interference and noise ratio (SINR).

39. The apparatus of claim 32, wherein to develop the quantized version of the angular-domain response amplitude vector the communication device is further configured to perform a channel measurement for at least one antenna of the receiver using a signal received from at least one of the transmit antennas at the at least one receiver antenna.

40. The apparatus of claim 39, wherein to develop the quantized version of the angular-domain response amplitude vector the communication device is further configured to determine channel coefficients for each of the transmit antennas based on the channel measurement.

41. The apparatus of claim 39, wherein to develop the quantized version of the angular-domain response amplitude vector the communication device is further configured to determine channel coefficients for each of the transmit antennas based on the channel measurement and to directly apply a reversible transform to the determined channel coefficients to develop the one or more channel components of the vector in the angular domain.

42. The apparatus of claim 39, wherein to perform a channel measurement the communication device is further configured to measure pilot information received from each of the plurality of transmit antennas.

43. The apparatus of claim 32, wherein the communication device is further configured to apply a filter to the at least one channel component in the transform domain at the at least one receiver.

44. The apparatus of claim 32, wherein the feedback signal further comprises information indicative of the measure of uncertainty.

45. The apparatus of claim 32, wherein the at least one selected point is a channel component that forms one of an absolute or a relative maximum of magnitude in the angular-domain response amplitude vector.

46. The apparatus of claim 32, wherein the communication device is further configured to:
- ascertain more than one relative maximum of magnitude of the channel components;
- measure an amplitude of the respective relative maxima; and
- measure a phase difference between the channel components forming the relative maxima.

* * * * *